US009231647B2

(12) United States Patent
Polydoros et al.

(10) Patent No.: US 9,231,647 B2
(45) Date of Patent: Jan. 5, 2016

(54) JOINT ANALOG AND DIGITAL INTERFERENCE CANCELLATION IN WIRELESS SYSTEMS

(71) Applicant: TrellisWare Technologies, Inc., San Diego, CA (US)

(72) Inventors: Andreas Polydoros, San Diego, CA (US); Mark Johnson, Poway, CA (US); Thomas R. Halford, Manhattan Beach, CA (US); Michael P Fitz, Los Angeles, CA (US); Scott W Enserink, San Diego, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 57 days.

(21) Appl. No.: 14/219,938

(22) Filed: Mar. 19, 2014

(65) Prior Publication Data

US 2015/0270865 A1   Sep. 24, 2015

(51) Int. Cl.
*H04L 25/08* (2006.01)
*H04B 1/62* (2006.01)
*H04B 1/10* (2006.01)

(52) U.S. Cl.
CPC ............... *H04B 1/62* (2013.01); *H04B 1/1027* (2013.01)

(58) Field of Classification Search
CPC ........ H04B 1/1027; H04B 1/12; H04B 1/123; H04B 7/15585; H04B 5/1461
USPC ........................................................ 375/346
See application file for complete search history.

(56) References Cited

U.S. PATENT DOCUMENTS

| 2014/0219449 | A1* | 8/2014 | Shattil et al. | ........... 380/270 |
| 2015/0139122 | A1* | 5/2015 | Rimini | ......... H04B 1/123 370/329 |
| 2015/0180640 | A1* | 6/2015 | Liu | ............. H04B 1/525 370/278 |

OTHER PUBLICATIONS

Bharadia et al. "Full duplex radios," Proc. ACM SIGCOMM, Aug. 2013, pp. 375-386.
Sahai et al., "Understanding the Impact of Phase Noise on Active Cancellation in Wireless Full-Duplex," IEEE Proc. Asilomar, Nov. 2012, pp. 29-33.

* cited by examiner

*Primary Examiner* — Shuwang Liu
*Assistant Examiner* — David S Huang
(74) *Attorney, Agent, or Firm* — Kilpatrick Townsend & Stockton LLP

(57) ABSTRACT

An apparatus for joint analog and digital interference cancellation includes a receiver configured to receive an analog reference interfering signal on a reference path, and a sum of an analog interference signal and an analog signal of interest on an antenna path. An analog interference canceller may be configured to produce an analog partially interference-cancelled signal using the analog reference interfering signal and the sum of the analog interference signal and the analog signal of interest. A first analog-to-digital converter may be configured to digitize the analog reference interfering signal to produce a digital reference interfering signal. A second analog-to-digital converter may be configured to digitize the analog partially interference-cancelled signal to produce a digital partially interference-cancelled signal. A digital interference canceller may be configured to produce an interference-cancelled signal using the digital reference interfering signal and the digital partially interference-cancelled signal.

20 Claims, 7 Drawing Sheets

US 9,231,647 B2

JOINT ANALOG AND DIGITAL INTERFERENCE CANCELLATION IN WIRELESS SYSTEMS

GOVERNMENT LICENSE RIGHTS

This invention was made with government support under W15P7T-12-C-A317 awarded by the U. S. Army (Army Contracting CMD-APG).

FIELD OF THE INVENTION

The present invention relates to a system and method for joint analog and digital interference cancellation for wireless communications, thereby improving communication in the presence of interfering signals.

BACKGROUND

As wireless communication systems often require the ability to communicate in the presence of strong interfering signals, they employ, for example, "full-duplex" operations in the commercial domain and interference excision in military applications. These techniques rely on a copy of the interfering signal being available in real-time, which enables the cancellation (or subtraction) of the interference, in contrast to classic, passive interference-nulling techniques that purport to reduce the level of unknown interference. The present invention is part of the class of active interference cancellation techniques, employing joint analog and digital interference cancellation to improve communication in the presence of interference.

SUMMARY

Embodiments of the present invention are directed to methods and systems, including computer program products, for joint analog and digital interference cancellation in wireless communication systems. For example, in one embodiment, a method for joint analog and digital interference cancellation comprises receiving an analog reference interfering signal on a reference path; receiving a sum of an analog interference signal and an analog signal of interest on an antenna path; producing an analog partially interference-cancelled signal via analog interference cancellation using the analog reference interfering signal and the sum of the analog interference signal and the analog signal of interest; digitizing the analog reference interfering signal to produce a digital reference interfering signal; digitizing the analog partially interference-cancelled signal to produce a digital partially interference-cancelled signal; and producing the interference-canceled signal via digital interference cancellation using the digital reference interfering signal and the digital partially interference-cancelled signal, wherein the analog reference interfering signal may be propagated through a transmission medium to produce the analog interference signal, and wherein the analog interference cancellation and the digital interference cancellation may be agnostic to the structure and parameters of the analog reference interfering signal.

These illustrative embodiments are mentioned not to limit or define the limits of the present subject matter, but to provide examples to aid in the understanding thereof. Illustrative embodiments are discussed in the Detailed Description, and further examples are provided there. Advantages offered by various embodiments may be further understood by examining this specification and/or by practicing one or more embodiments of the claimed subject matter.

Figure 1:
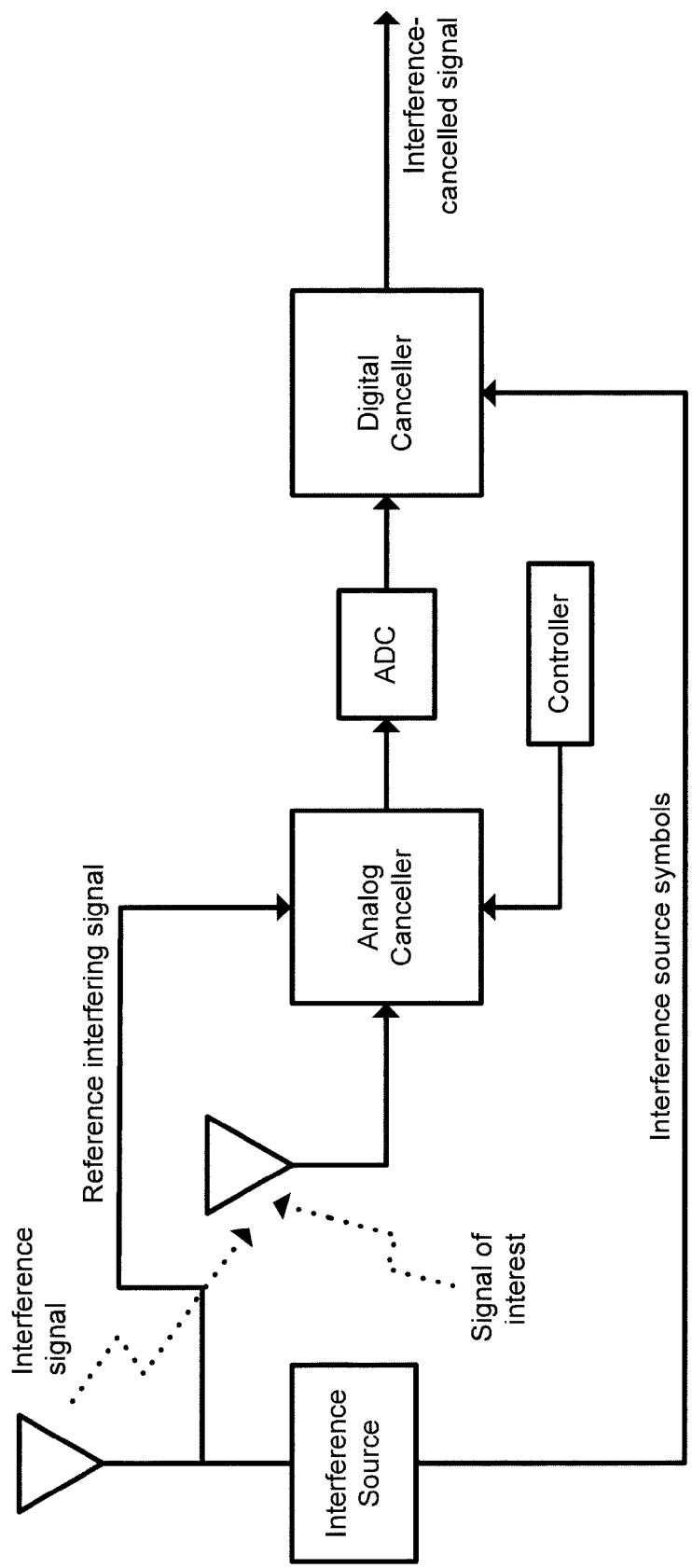
FIG. 1 is a block diagram of representative prior art in active interference cancellation techniques that employ cascaded analog and digital interference cancellation stages.

Like labels are used to refer to the same or similar modules in the drawings.

DETAILED DESCRIPTION

Communication in the presence of interfering signals via active interference cancellation has been previously studied in the context of full-duplex communication, wherein the transmitter is co-located with the receiver, and simultaneous transmit and receive (STAR) is required (see, for example, Bharadia et al. "Full duplex radios," *Proc. ACM SIGCOMM*, August 2013, pp. 375-386). FIG. 1 is a block diagram of prior art that is representative of full-duplex communication in STAR systems as described in the aforementioned reference. The prior art receives the sum of a signal of interest and an interference signal on a receive antenna and attempts to cancel the interference signal.

In particular, as shown in FIG. 1, the analog canceller receives the sum of the signal of interest and the interference signal, and first uses an analog reference interfering signal, which is obtained from the analog portion of the interference source, to cancel out the interference signal. The resulting partially interference-cancelled signal is then digitized. In the subsequent digital canceller stage, the interference source symbols, which are obtained from the digital portion of the interference source, are used to cancel the remnants of the interference signal in the partially interference-cancelled signal, yielding the interference-canceled signal. The analog and digital cancellers achieve 110 dB of cancellation and eliminate self-interference to the noise floor.

FIG. 1 depicts a paradigm wherein reference signals from distinct portions of the interference source are employed for the cascaded analog and digital cancellation stages. The analog canceller uses an analog reference interfering signal that may be tapped before transmission through the antenna, whereas the digital canceller uses an interference reference signal based on interference source symbols, which are obtained from the digital components of the interference source.

The present invention, described in the various embodiments herein, employs a distinct architecture in comparison to that depicted in FIG. 1 for the full-duplex STAR system. In contrast to using both an analog reference interfering signal and a digital symbol stream for the two-stage cancellation process, the present invention employs only the analog reference interfering signal for analog interference cancellation, and digitizes this signal for use in the digital interference cancellation stage.

Figure 2:
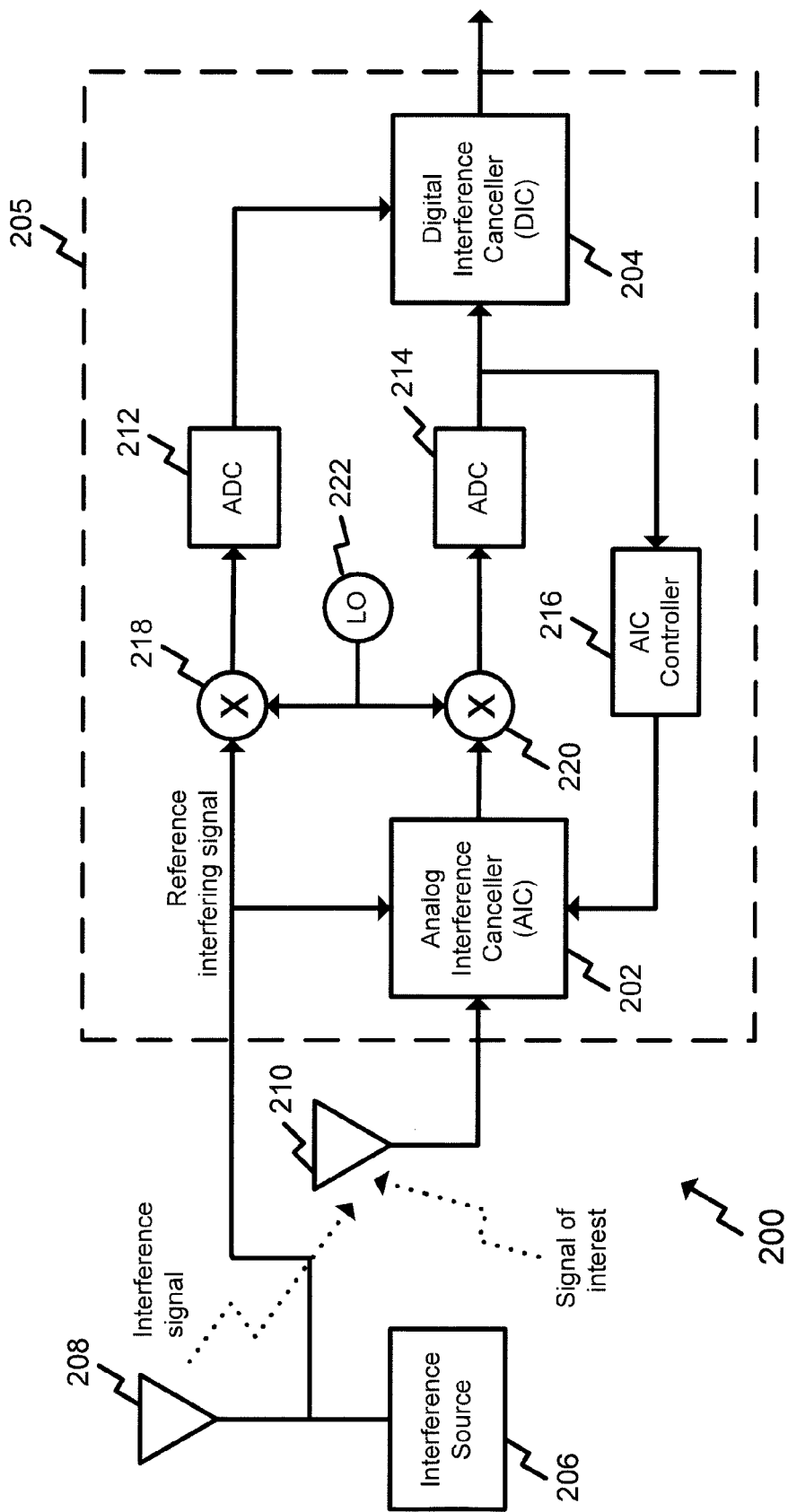
FIG. 2 is a block diagram of an embodiment of the joint analog and digital interference cancellation unit for wireless systems.

FIG. 2 depicts an embodiment of the joint analog and digital interference cancellation system 200 for wireless communications. The joint analog and digital interference cancellation (JADIC) unit 205 may receive two inputs: (1) the reference interfering signal and (2) the sum of a signal of interest and an interference signal via antenna 210. The interference signal may be the result of propagating the reference interfering signal through a transmission medium. In an embodiment, the transmission medium is an over-the-air channel that may comprise multipath components, and the reference interfering signal may be obtained via a local tether. The reference interfering signal may be provided by a physical wire or link connecting the amplifier output of the interference source 206 and the receiver portion of the JADIC unit 205. In another embodiment, the transmission medium is full-duplex hardware, such as a circulator, which may distort the signal to some degree, for instance, by adding multipath.

The reference interfering signal and the sum of the signal of interest and the interference signal are input to the analog interference canceller (AIC) 202, which produces a partially interference-cancelled signal. In an embodiment, the AIC is a single-tap adaptive analog canceller, which adjusts one or more of the phase, the gain, and the delay of the reference interfering signal, and subtracts it from the sum of the signal of interest and the interference signal via a signal combiner. In another embodiment, the AIC may be a multi-tap linear adaptive canceller, which may be used if the transmission medium has significant multipath components. Adding taps typically improves the cancellation performance of the AIC, but may be achieved at the expense of significant complexity since, for example, over-the-air multipath delays may span several microseconds and are not known in advance.

In this embodiment, the AIC may operate at a radio frequency (RF) or at an intermediate frequency (IF), and subsequent to the analog interference cancellation, the analog reference interfering signal and the analog partially interference-cancelled signal may be coherently downconverted using mixers 218 and 220, respectively, and local oscillator 222. Coherent downconversion ensures that the phase noise characteristics of the two signals are preserved in order to enable their cancellation in the digital cancellation stage.

The downconverted analog reference interfering signal and the analog partially interference-cancelled signal may be digitized using analog-to-digital converters (ADCs) 212 and 214, respectively. Parameters of the digital partially interference-cancelled signal may be used to control the AIC via controller 216. In an embodiment, the power of the digital partially interference-cancelled signal is used to determine what phase, gain, and delay adjustments should be applied to the analog reference interfering signal in the AIC.

The digital reference interfering signal and the digital partially interference-canceled signal may be input to the digital interference canceller (DIC) 204, which produces the interference-cancelled signal. In an embodiment, the DIC comprises a signal combiner that subtracts the digital reference interfering signal from the digital partially interference-cancelled signal. In another embodiment, the DIC comprises filtering the digital reference interfering signal and then subtracting the digital filtered reference interfering signal from the digital partially interference-cancelled signal to produce the interference-cancelled signal.

In an embodiment, the filter in the DIC is a linear filter, wherein the filter taps are based on parameters of the interference-cancelled signal. In another embodiment, the DIC filter is a non-linear filter with filter taps that are further based on, for example, the Volterra series. The Volterra series is a model for the non-linear behavior of a system, wherein the output of the system at a particular time may depend on the input to the system at all other times.

FIG. 2 depicts an embodiment of joint analog and digital interference cancellation in wireless systems that is distinct from the prior art shown in FIG. 1. In contrast to using the reference interfering signal from the analog portion of the interference source and the interference source symbol stream from the digital portion of the interference source, only the reference interfering signal from the analog portion of the interference source 206 is used for the AIC, and the same signal is digitized for use in the DIC.

The active interference cancellation architecture depicted in FIG. 2 provides at least two distinct advantages over previously studied active interference cancellation techniques: the present invention provides better matching on transmit non-linearities in both cancellation stages, and cancellation of the phase noise in the digital interference cancellation stage.

Firstly, using the analog reference interfering signal in the AIC and its digitized counterpart in the DIC provides better matching of transmit non-linearities between the reference signals and the interference signal in both of the cancellation stages. Specifically, the interference signal transmitted from antenna 208 may include transmit non-linearities, but since the analog reference interfering signal is tapped at the amplifier output of the interference source 206, the same transmit non-linearities may be present in the reference signals for both the AIC and DIC stages. In contrast, the prior art depicted in FIG. 1 uses interference source symbols that are obtained directly from the digital portion of the interference source for the digital canceller; the digital interference source symbol will not contain any transmit non-linearities that might exist in the interference signal. Matching the transmit non-linearities typically obviates the need for non-linear equalization in the digital processing stage and reduces the complexity of the architecture.

Secondly, coherently downconverting both the reference interfering signal and the partially interference-cancelled signal after the analog cancellation stage preserves phase noise characteristics of the signals, and enables their cancellation in the subsequent digital cancellation stage. Mismatched phase noises result in a degradation of cancellation performance of 10 dB (see, for example, Sahai et al., "Understanding the Impact of Phase Noise on Active Cancellation in Wireless Full-Duplex," *IEEE Proc. Asilomar*, November 2012, pp. 29-33). The prior art depicted in FIG. 1 uses interference source symbols that are obtained directly from the digital portion of the interference source for the digital canceller, and thus do not contain the phase noise characteristics of the reference interfering signal.

In an embodiment, the interfering signal source 206 and the JADIC unit 205 may be on separate radio platforms, i.e. the interfering signal source and the JADIC unit may have distinct local oscillators and clocks. The resulting phase mismatch when different oscillators are used for the reference interfering signal and the sum of the interference signal and the signal of interest can result in the aforementioned degradation in interference cancellation. This necessitates the need to coherently downconvert in the analog domain to preserve the characteristics so that they may be canceled in the subsequent DIC stage.

Figure 3:
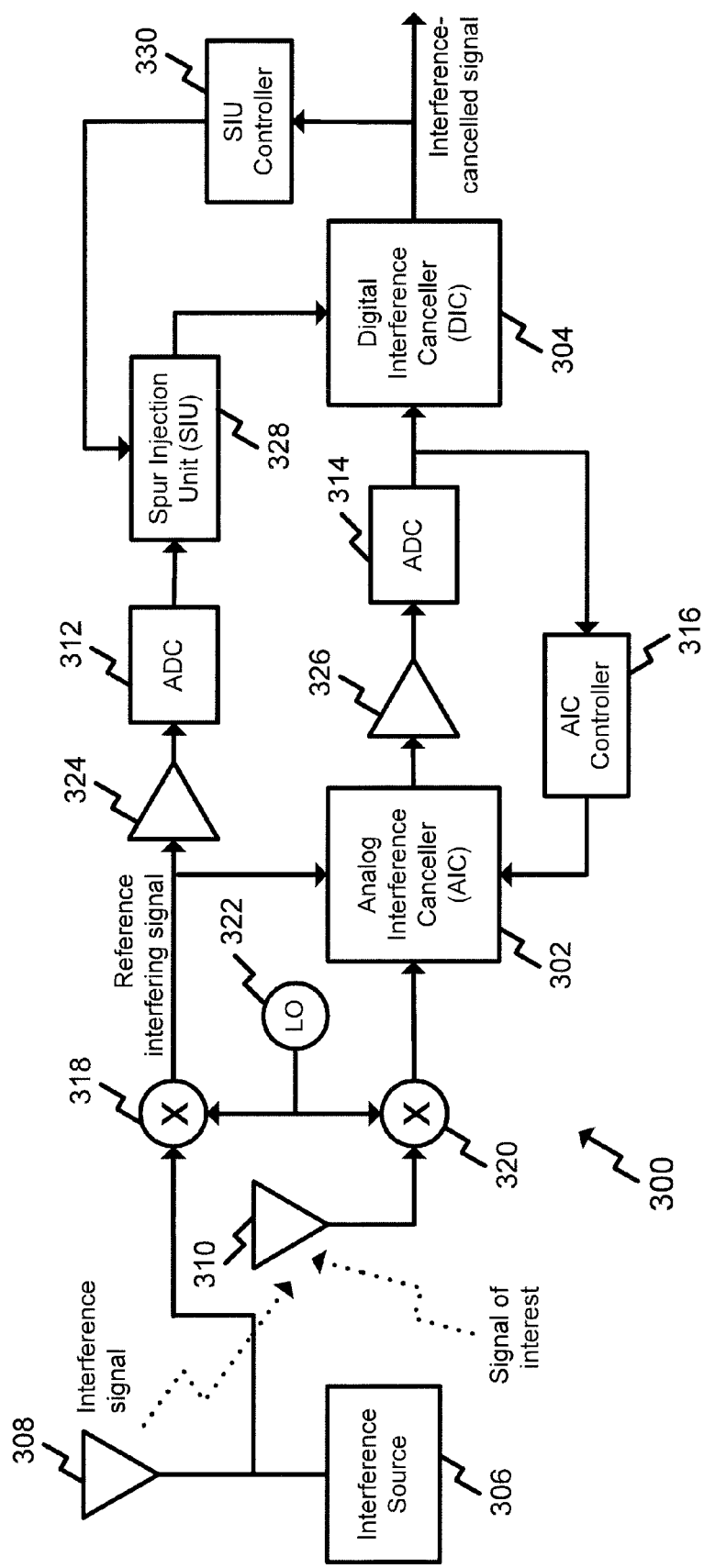
FIG. 3 is a block diagram of another embodiment of the joint analog and digital interference cancellation unit for wireless systems.

FIG. 3 depicts another embodiment of the joint analog and digital interference cancellation system 300 for wireless communications. This embodiment includes some features and/or components that are similar to those shown in FIG. 2 and described above. At least some of these features and/or components may not be separately described in this section. In this embodiment, the reference interfering signal and the sum of the interference signal and signal of interest may be downcoverted by mixers 318 and 320, respectively, and the AIC may operate at IF or baseband. Furthermore, the reference interfering signal and the partially interference-canceled signal may be scaled by amplifiers 322 and 324, respectively, prior to digitization.

In an embodiment, the interference source 306 may be a jammer, which results in the power of the interference signal, i.e. the jamming signal, being several orders of magnitude higher than the power of the signal of interest. This results in unequal power levels between the reference interfering signal and the partially interference-canceled signal after the AIC stage, which may necessitate distinct amplification or attenuation of these signals prior to their digitization.

In another embodiment, the interference source 306 may be a radar system, wherein the interference signal may be a radar signal and the signal of interest may be an unknown communication signal, and there may be a requirement to communicate simultaneously with radar operation in a Simultaneous Radar and Spectrum Sensing (SRSS) application. The simultaneous operation of radar and spectrum sensing may preclude the use of time-multiplexing, but may be achieved according to an embodiment of the present invention.

As depicted in FIG. 3, the digitized reference interfering signal may be adjusted prior to its use in the DIC. In an embodiment, frequency spurs or frequency tones that are identified in the interference-cancelled signal may be inserted into the reference signal by the spur injection unit (SIU) 328 to ensure their cancellation in the DIC. The insertion of the frequency spurs may be controlled by the SIU controller 330, and may be based on analysis of the interference-canceled signal.

Frequency spurs are a common artifact of intermodulation distortion, which may be caused by non-linear signal processing, or by hardware components that are not precisely calibrated or designed. The frequency location of the spurs may coincide with the frequency location of the signal of interest, and thereby prevent its extraction. Eliminating frequency spurs, which may be caused by either hardware or signal processing methods, ensures that the signal of interest may be extracted from anywhere within the frequency band of interest.

Figure 4:
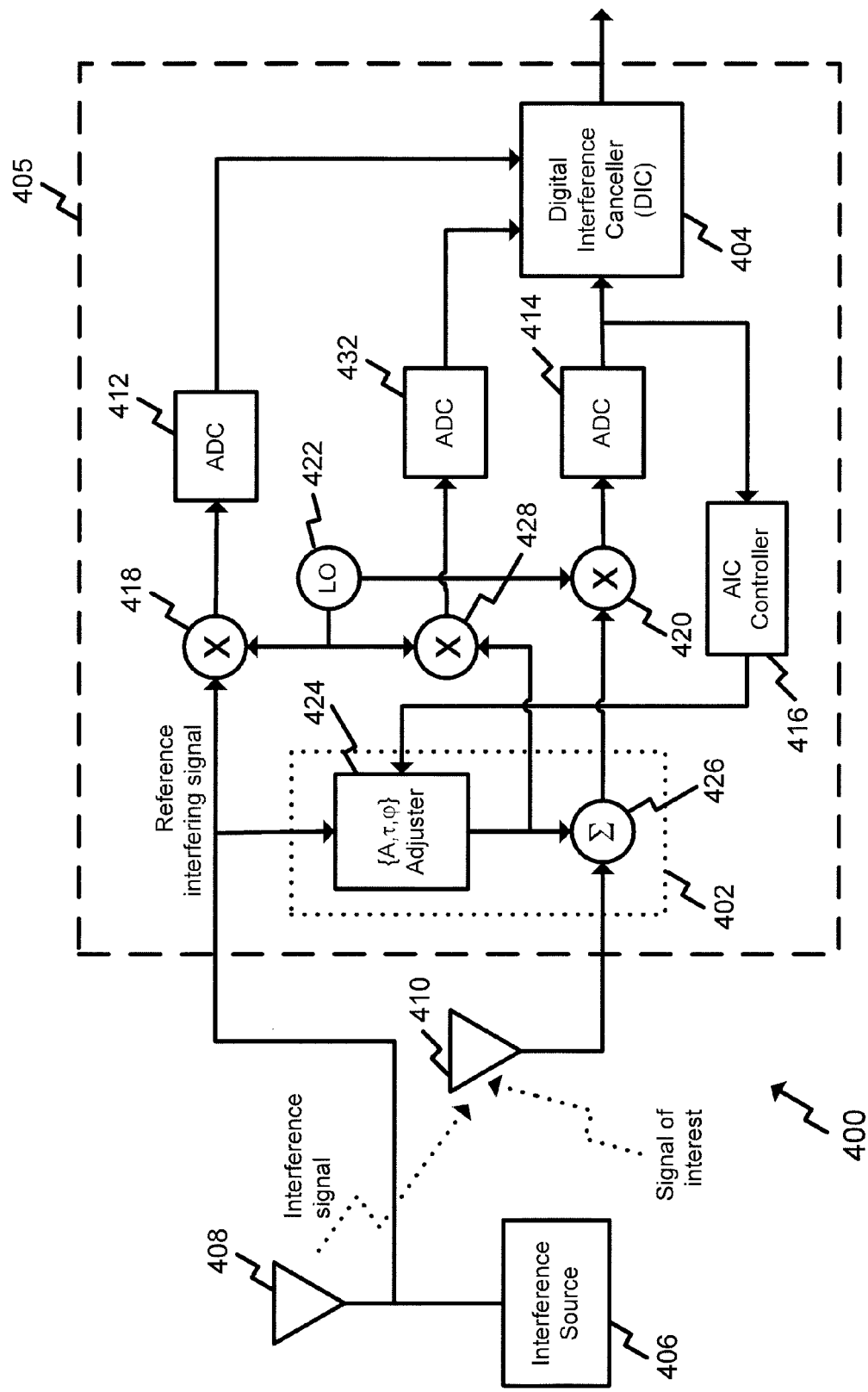
FIG. 4 is a block diagram of yet another embodiment of the joint analog and digital interference cancellation unit for wireless systems.

FIG. 4 depicts yet another embodiment of the joint analog and digital interference cancellation system 400 for wireless communications. This embodiment includes some features and/or components that are similar to those shown in FIGS. 2-3 and described above. At least some of these features and/or components may not be separately described in this section. The analog interference canceller 402 in this embodiment may comprise a gain-phase-delay adjuster 424 that adjusts one or more of the phase, the gain, and the delay of the reference interfering signal, and may further comprise a signal combiner 426 that subtracts the adjusted reference interfering signal from the sum of the signal of interest and the interference signal.

The adjustment of one or more of the gain, phase, and delay of the reference interfering signal may introduce nonlinear effects, such as intermodulation products, into the adjusted reference interfering signal, which may adversely impact the performance of the digital interference canceller. To mitigate these nonlinear effects, the adjusted reference interfering signal may be coherently downconverted via mixer 428 and local oscillator 422, and may be digitized using analog-to-digital converter 432 to produce a digital adjusted reference interfering signal. The digital adjusted reference interfering signal may be used in conjunction with the digital reference interference signal and the digital partially interference-cancelled signal to produce the interference-cancelled signal, wherein the effects of the intermodulation products may have been minimized.

Figure 5:
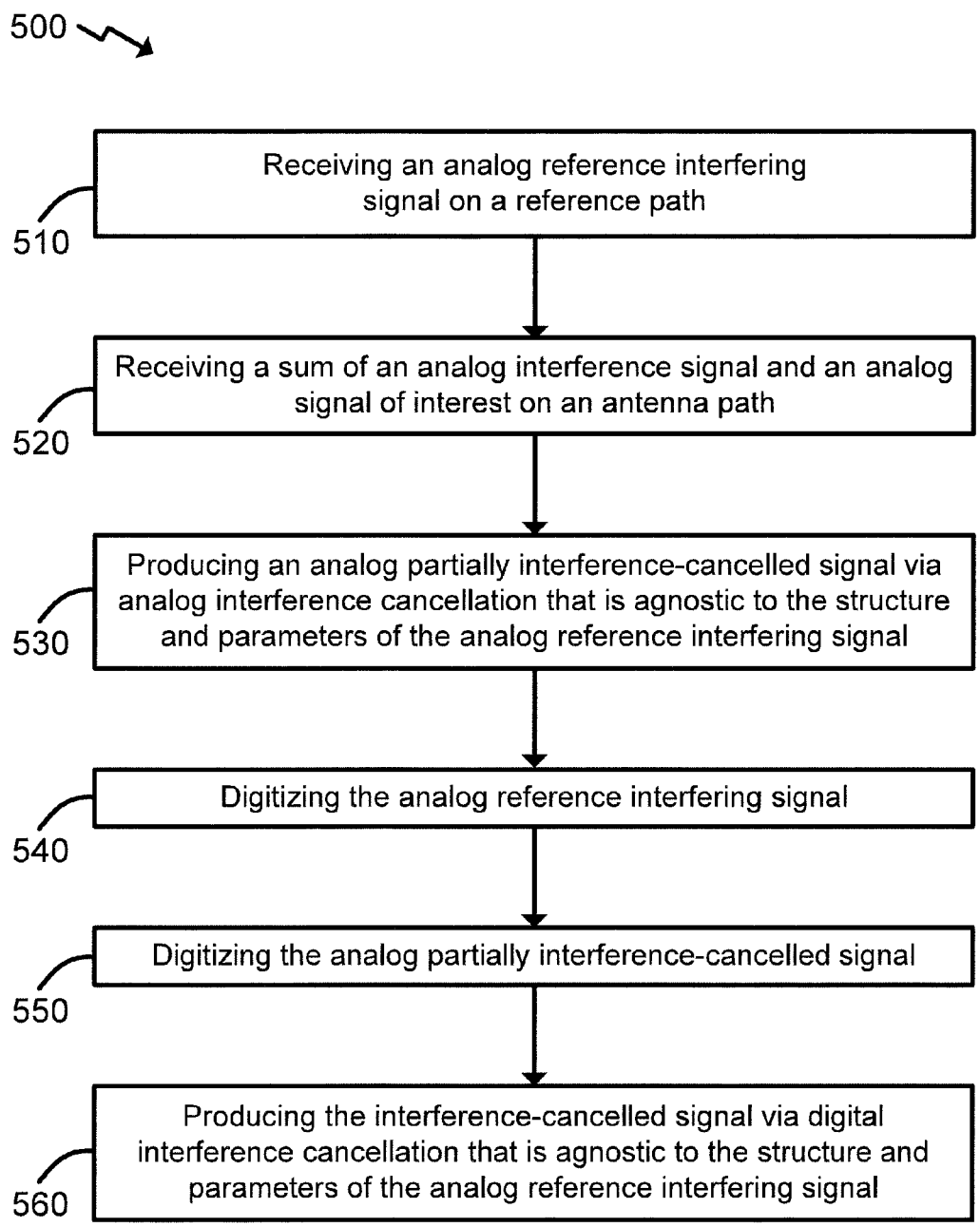
FIG. 5 is a flow chart for a method for joint analog and digital interference cancellation, according to an embodiment of the present invention.

FIG. 5 is a flowchart for a method for joint analog and digital interference cancellation, according to an embodiment of the present invention. In some embodiments, the order of steps in flowchart 500 may be changed. Furthermore, some of the steps in flowchart 500 may be skipped or additional steps added.

With reference to FIGS. 2, 3 and 4, the method 500 begins at 510 when an analog reference interfering signal is received on a reference path. The analog reference interfering signal is a copy of the interference and is available in real-time. This signal may be supplied to the receiver portion of the JADIC unit via a physical wire or link that is connected to the amplifier output of the interference source.

The method continues at step 520 when the sum of an analog interference signal and an analog signal of interest is received on an antenna path. The analog interference signal may be produced by propagating the analog reference interfering signal through a transmission medium, which may be an over-the-air multipath channel or a circulator. In the general case, the analog interference signal may be a transformed version of the analog reference interfering signal.

At step 530, the AIC produces an analog partially interference-canceled signal by subtracting an adjusted version of the analog reference interfering signal from the sum of the analog interference signal and the analog signal of interest. The AIC may comprise a single- or multi-tap linear adaptive canceller, which may be controlled based on parameters of either the analog or digital partially interference-cancelled signal. In contrast to the prior art, wherein the parameters of the multi-tap analog canceller are determined based on a WiFi preamble sequence of the reference interfering signal, the AIC in the present invention may be agnostic to the structure and parameters of the reference interfering signal.

At step 540, the analog reference interfering signal is digitized using a first ADC to produce a digital reference interfering signal.

At step 550, the analog partially interference-cancelled signal is digitized using a second analog-to-digital converter to produce a digital partially interference-cancelled signal. In an embodiment, the first and second ADCs are frequency-locked.

At step 560, the DIC produces the interference-canceled signal by subtracting the digital reference interfering signal from the digital partially interference-cancelled signal. In other embodiments, the DIC may further comprise a filter, wherein the filtering digital reference interfering signal is subtracted from the digital partially interference-cancelled signal to produce the interference-cancelled signal.

The filter taps of the filter, which may be a linear or non-linear filter, may be determined based on parameters of the interference-cancelled signal. In the prior art depicted in FIG. 1, the parameters of a non-linear digital filter may be determined based on the WiFi preamble sequence of the reference interfering signal. The received preamble samples, which comprise known transmitted symbols, may be used to determine the filter taps of a non-linear digital filter. In contrast to the prior art, the DIC in the present invention may determine the filter taps based on parameters of the interference-cancelled signal, and may not rely on preamble or pilot symbols in the digital cancellation stage. The DIC may not depend on preambles or pilots embedded in the reference interfering signal, and therefore may be agnostic to the structure and parameters of the reference interfering signal.

Figure 6A:
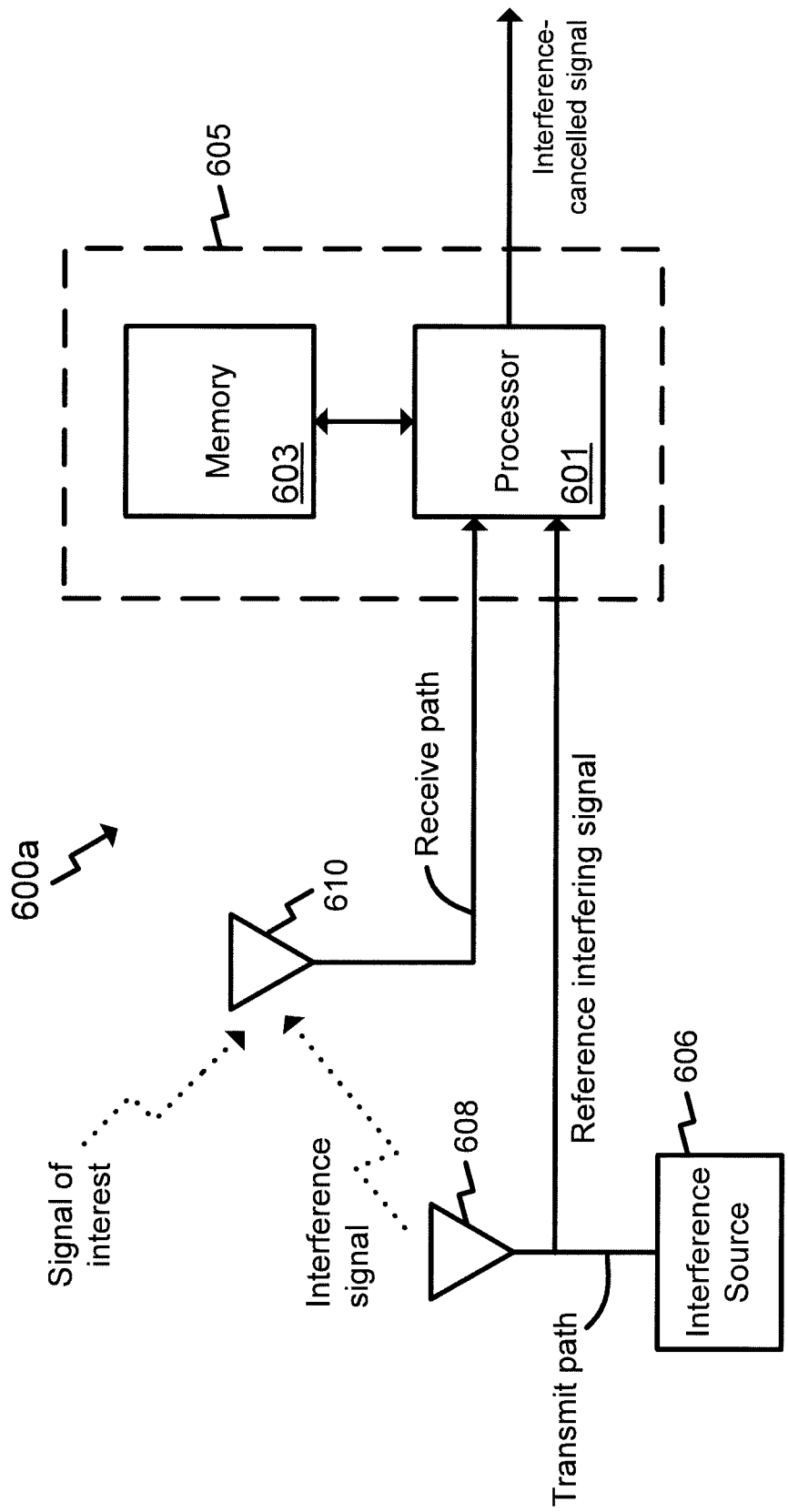
FIG. 6(a) is a block diagram of a system comprising the joint analog and digital interference cancellation unit according to an embodiment of the present invention.

FIG. 6(a) is a block diagram of a system that implements a method for joint analog and digital interference cancellation in wireless systems according to an embodiment of the present invention. As shown in FIG. 6(a), the system 600a comprises the JADIC unit 605 that comprises a processor 601 and a memory 603. The system 600a further comprises an interference source 606 with a transmission antenna 608, and a receive antenna 610 that feeds the JADIC unit. Herein, transmission antenna 608 may broadcast an interference signal from a transmit path, which is received on receive antenna 610 along with the signal of interest on the receive path. In this embodiment, the transmission medium may be the over-the-air channel, which might comprise multipath components.

Figure 6B:
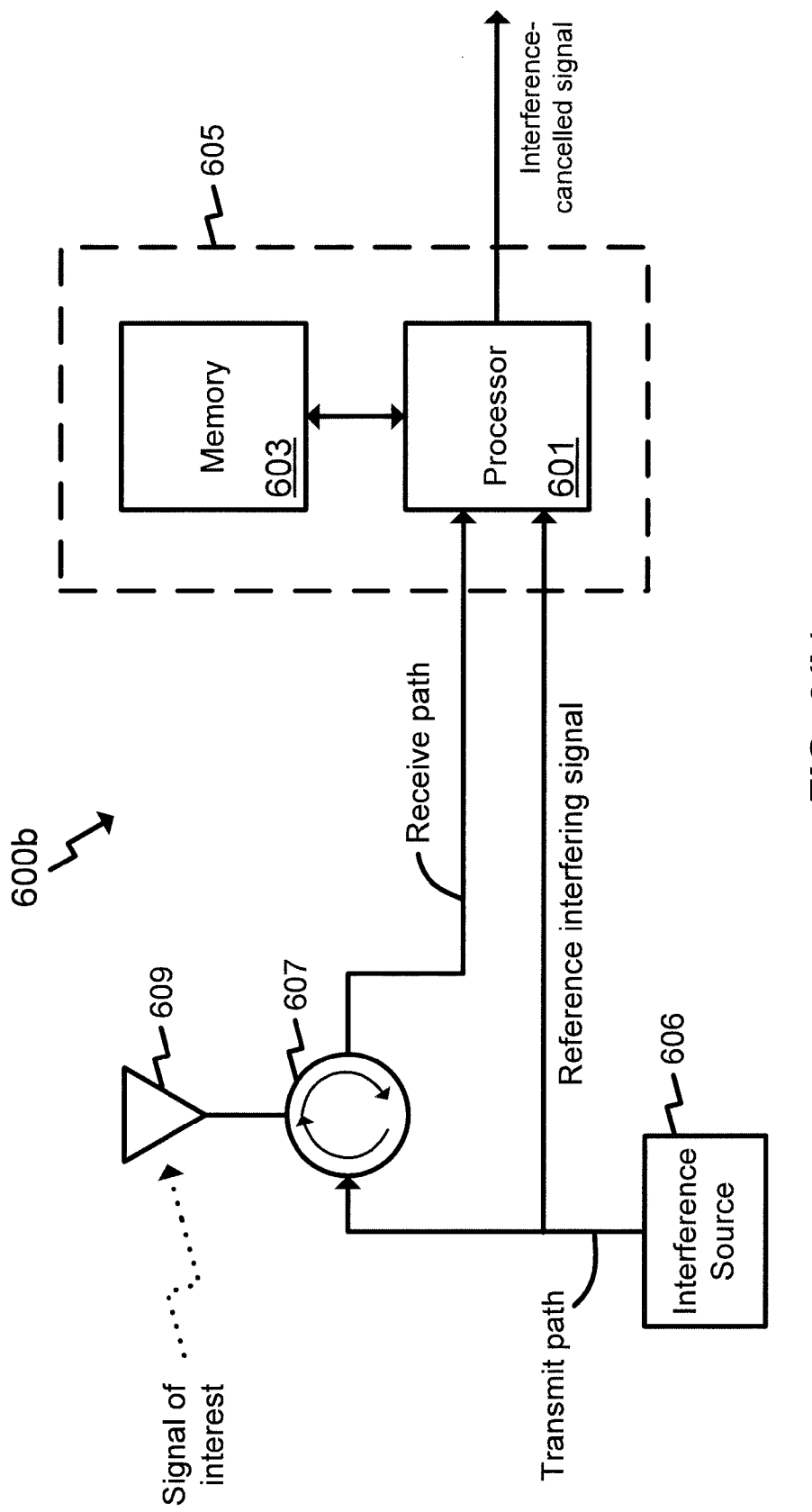
FIG. 6(b) is a block diagram of a system comprising the joint analog and digital interference cancellation unit according to another embodiment of the present invention.

FIG. 6(b) is a block diagram of a system that implements a method for joint analog and digital interference cancellation in wireless systems according to another embodiment of the present invention. The system 600b comprises the JADIC unit 605 that comprises the processor 601 and the memory 603. In this embodiment, a single antenna may be used for both transmitting and receiving signals, and a circulator 607 connects the transmit path and the receive path to the single antenna 609. Herein, the transmission medium may be the circulator, which may cause the transmitting (or interference) signal to be combined with the received signal of interest and sent to the JADIC unit via the receive path.

The processor 601 may comprises component analog and digital processors, and may be configured to execute computer-executable program instructions stored in memory 603. For example, the component analog processor may comprise analog signal processing means for analog interference cancellation, and the component digital processor may execute one or more computer programs for digital interference cancellation in accordance with embodiments of the present invention.

Processor 601 may comprise a variety of implementations for phase shifting, switching, delaying, amplification, and attenuation in the analog domain, as well as a microprocessor, a digital signal processor (DSP), an application-specific integrated circuit (ASIC), one or more field programmable gate arrays (FPGAs), state machines, or the like. Processor 601 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or other similar devices.

Memory 603 may comprises a non-transitory computer-readable medium that stores instructions which, when executed by processor 601, cause processor 601 to perform various steps, such as those described herein. Examples of computer-readable media include, but are not limited to, electronic, optical, magnetic, or other storage or transmission devices capable of providing processor 601 with computer-readable instructions. Other examples of computer-readable media comprise, but are not limited to, a floppy disk, CD-ROM, magnetic disk, memory chip, ROM, RAM, ASIC, configured processor, all optical media, all magnetic tape or other magnetic media, or any other medium from which a computer processor can access data. In addition, various other devices may include computer-readable media such as a router, private or public network, or other transmission devices. The processor 601 and the processing described may be in one or more structures, and may be dispersed throughout one or more structures.

Embodiments in accordance with aspects of the present subject matter can be implemented in analog electrical circuitry and/or digital electronic circuitry, in analog signal processing means and computer hardware, firmware, software, or in combinations of the preceding. In one embodiment, a computer may comprise a processor or processors. A processor comprises or has access to a computer-readable medium, such as a random access memory (RAM) coupled to the processor.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method for joint analog and digital interference cancellation, the method comprising:
   receiving an analog reference interfering signal from an interference source, the analog reference interfering signal received on a reference path that comprises an amplifier;
   receiving a sum of an analog interference signal and an analog signal of interest on an antenna path;
   producing an analog partially interference-cancelled signal via analog interference cancellation using the analog reference interfering signal and the sum of the analog interference signal and the analog signal of interest;
   digitizing the analog reference interfering signal to produce a digital reference interfering signal;
   digitizing the analog partially interference-cancelled signal to produce a digital partially interference-cancelled signal; and
   producing an interference-cancelled signal via digital interference cancellation using the digital reference interfering signal and the digital partially interference-cancelled signal,
   wherein the analog reference interfering signal is propagated through a transmission medium to produce the analog interference signal, and
   wherein the analog interference cancellation and the digital interference cancellation are agnostic to the structure and parameters of the analog reference interfering signal.

2. The method of claim 1, the method further comprising:
   controlling the analog interference cancellation based on parameters of the digital partially interference-cancelled signal.

3. The method of claim 1, wherein the analog interference cancellation comprises:
   adjusting one or more of a phase, a gain, or a delay of the analog reference interfering signal to produce an analog adjusted reference interfering signal; and
   subtracting the analog adjusted reference interfering signal from the sum of the analog interference signal and the analog signal of interest to produce the analog partially interference-cancelled signal.

4. The method of claim 3, the method further comprising:
digitizing the analog adjusted reference interfering signal to produce a digital adjusted reference interfering signal, wherein the digital interference cancellation further uses the digital adjusted reference interfering signal to produce the interference-cancelled signal.

5. The method of claim 1, the method further comprising:
injecting frequency spurs into the digital reference interfering signal prior to using the digital reference interfering signal for the digital interference cancellation,
wherein the injecting of the frequency spurs is controlled based on parameters of the interference-cancelled signal.

6. The method of claim 1, wherein the digital interference cancellation comprises:
filtering the digital reference interfering signal to produce a filtered digital reference interfering signal; and
subtracting the filtered digital reference interfering signal from the digital partially interference-cancelled signal to produce the interference-cancelled signal.

7. The method of claim 6, wherein the filtering comprises linear filtering.

8. The method of claim 6, wherein the filtering comprises non-linear filtering.

9. The method of claim 8, wherein the non-linear filtering is based on a Volterra series.

10. The method of claim 1, wherein the analog interference signal is a jamming signal, and wherein a power of the jamming signal is several orders of magnitude greater than a power of the analog signal of interest.

11. The method of claim 1, the method further comprising:
scaling the analog partially interference-cancelled signal by a first gain prior to its digitization; and
scaling the analog reference interfering signal by a second gain prior to its digitization.

12. An apparatus for joint analog and digital interference cancellation, the apparatus comprising:
a receiver configured to receive an analog reference interfering signal from an interference source, the analog reference interfering signal received on a reference path that comprises an amplifier, the receiver also configured to receive a sum of an analog interference signal and an analog signal of interest on an antenna path;
an analog interference canceller configured to produce an analog partially interference-cancelled signal using the analog reference interfering signal and the sum of the analog interference signal and the analog signal of interest;
a first analog-to-digital converter configured to digitize the analog reference interfering signal to produce a digital reference interfering signal;
a second analog-to-digital converter configured to digitize the analog partially interference-cancelled signal to produce a digital partially interference-cancelled signal; and
a digital interference canceller configured to produce an interference-cancelled signal using the digital reference interfering signal and the digital partially interference-cancelled signal,
wherein the analog reference interfering signal is propagated through a transmission medium to produce the analog interference signal, and
wherein the analog interference cancellation and the digital interference cancellation are agnostic to the structure and parameters of the analog reference interfering signal.

13. The apparatus of claim 12, wherein the analog interference canceller comprises:
a gain-phase-delay adjuster configured to adjust one or more of a phase, a gain, or a delay of the analog reference interfering signal to produce an analog adjusted reference interfering signal; and
a signal combiner configured to subtract the analog adjusted reference interfering signal from the sum of the analog interference signal and the analog signal of interest to produce the analog partially interference-cancelled signal.

14. The apparatus of claim 12, wherein the digital interference canceller comprises:
a signal combiner configured to subtract the digital reference interfering signal from the digital partially interference-cancelled signal to produce the interference-cancelled signal.

15. The apparatus of claim 12, wherein the digital interference canceller comprises:
a filter configured to filter the digital reference interfering signal to produce a filtered digital reference interfering signal; and
a signal combiner configured to subtract the filtered digital reference interfering signal from the digital partially interference-cancelled signal to produce the interference-cancelled signal.

16. The apparatus of claim 15, wherein the filter is a linear filter.

17. The apparatus of claim 15, wherein the filter is a non-linear filter.

18. The apparatus of claim 12, wherein the analog interference signal is a jamming signal, and wherein a power of the jamming signal is several orders of magnitude greater than a power of the analog signal of interest.

19. The apparatus of claim 12, the apparatus further comprising:
a first amplifier configured to scale the analog partially interference-cancelled signal by a first gain value prior to its digitization; and
a second amplifier configured to scale the analog reference interfering signal by a second gain value prior to its digitization.

20. A non-transitory tangible computer-readable medium embodying program code executable by a computing system, the program code comprising:
program code for receiving an analog reference interfering signal from an interference source, the analog reference interfering signal received on a reference path that comprises an amplifier;
program code for receiving a sum of an analog interference signal and an analog signal of interest on an antenna path;
program code for producing an analog partially interference-cancelled signal via analog interference cancellation using the analog reference interfering signal and the sum of the analog interference signal and the analog signal of interest;
program code for digitizing the analog reference interfering signal to produce a digital reference interfering signal;
program code for digitizing the analog partially interference-cancelled signal to produce a digital partially interference-cancelled signal; and program code for producing an interference-cancelled signal via digital interference cancellation using the digital reference interfering signal and the digital partially interference-cancelled signal, wherein the analog reference interfering signal is propagated through a transmission medium to produce the analog interference signal, and wherein the analog interference cancellation and the digital interference cancellation are agnostic to the structure and parameters of the analog reference interfering signal.

* * * * *